US012299983B2

(12) United States Patent
Zavesky (10) Patent No.: US 12,299,983 B2
(45) Date of Patent: May 13, 2025

(54) DETECTING AND SHARING EVENTS OF INTEREST USING PANOPTIC COMPUTER VISION SYSTEMS

(71) Applicant: AT&T Intellectual Property I, L.P., Atlanta, GA (US)

(72) Inventor: Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 553 days.

(21) Appl. No.: 17/645,534

(22) Filed: Dec. 22, 2021

(65) Prior Publication Data

US 2023/0196771 A1 Jun. 22, 2023

(51) Int. Cl.
| | | |
|---|---|---|
| *G06V 20/40* | (2022.01) | |
| *G06T 7/70* | (2017.01) | |
| *G06V 20/58* | (2022.01) | |
| *G06V 20/64* | (2022.01) | |
| *G06V 20/70* | (2022.01) | |

(52) U.S. Cl.
CPC ............ *G06V 20/44* (2022.01); *G06T 7/70* (2017.01); *G06V 20/58* (2022.01); *G06V 20/64* (2022.01); *G06V 20/70* (2022.01); *G06T 2207/30241* (2013.01)

(58) Field of Classification Search
CPC ........ G06V 20/44; G06V 20/58; G06V 20/70; G06T 7/70; G06T 2207/30241
See application file for complete search history.

(56) References Cited

U.S. PATENT DOCUMENTS

| | | | |
|---|---|---|---|
| 10,708,568 B2 * | 7/2020 | Christensen | ......... H04N 13/282 |
| 10,803,610 B2 | 10/2020 | Zavesky et al. | |
| 11,138,858 B1 * | 10/2021 | Segal | ................. G08B 25/014 |
| 2004/0246333 A1 * | 12/2004 | Steuart, III | .......... H04N 13/243 |
| | | | 348/42 |
| 2012/0212406 A1 * | 8/2012 | Osterhout | ............... G06F 3/005 |
| | | | 345/156 |
| 2013/0117780 A1 * | 5/2013 | Sukthankar | ......... G06F 16/7867 |
| | | | 725/32 |
| 2013/0339375 A1 * | 12/2013 | Adayikkoth | ........ G06F 11/3006 |
| | | | 707/754 |
| 2015/0058102 A1 * | 2/2015 | Christensen | ......... G11B 31/006 |
| | | | 705/14.6 |
| 2017/0240047 A1 * | 8/2017 | Candelore | ................... B60J 3/04 |
| 2018/0174412 A1 * | 6/2018 | Danielsson | ............ G06V 20/41 |
| 2022/0129667 A1 * | 4/2022 | Afrasiabi | ................ G06V 10/80 |
| 2023/0055581 A1 * | 2/2023 | Bidstrup | ................ H04N 7/181 |

FOREIGN PATENT DOCUMENTS

| | | | | |
|---|---|---|---|---|
| WO | WO-2006128124 A2 * | 11/2006 | ....... | G08B 13/19691 |
| WO | WO-2022110614 A1 * | 6/2022 | ............ | G06F 3/017 |

* cited by examiner

*Primary Examiner* — Edward F Urban
*Assistant Examiner* — Ashley L. Hytrek (57) ABSTRACT

In one example, a method performed by a processing system including at least one processor includes acquiring a plurality of video volumes of an environment from a plurality of cameras, wherein at least two individual video volumes of the plurality of video volumes depict the environment from different viewpoints, generating a panoptic video feed of the environment from the plurality of video volumes, detecting an event of interest occurring in the panoptic video feed, and isolating a video volume of the event of interest to produce a video excerpt.

20 Claims, 3 Drawing Sheets

FIG. 3 ns of interest using panoptic computer vision systems.

BACKGROUND

Modern computer vision systems may be deployed in a "panoptic" configuration, for instance including overlapping 360 degree or spherical viewpoints, to present a panoramic view of a scene. A panoptic configuration may therefore allow viewers to experience the scene in a more immersive way, by enabling the viewers to view the scene in any direction from a central viewpoint (e.g., including behind the viewers and to the sides of the viewers).

SUMMARY

In one example, the present disclosure describes a method, computer-readable medium, and system for detecting and sharing events of interest using panoptic computer vision systems. In one example, a method performed by a processing system including at least one processor includes acquiring a plurality of video volumes of an environment from a plurality of cameras, wherein at least two individual video volumes of the plurality of video volumes depict the environment from different viewpoints, generating a panoptic video feed of the environment from the plurality of video volumes, detecting an event of interest occurring in the panoptic video feed, and isolating a video volume of the event of interest to produce a video excerpt.

In another example, a non-transitory computer-readable medium stores instructions which, when executed by a processing system including at least one processor, cause the processing system to perform operations. The operations may include acquiring a plurality of video volumes of an environment from a plurality of cameras, wherein at least two individual video volumes of the plurality of video volumes depict the environment from different viewpoints, generating a panoptic video feed of the environment from the plurality of video volumes, detecting an event of interest occurring in the panoptic video feed, and isolating a video volume of the event of interest to produce a video excerpt.

In another example, a system includes a processing system including at least one processor and a non-transitory computer-readable medium storing instructions which, when executed by the processing system, cause the processing system to perform operations. The operations may include acquiring a plurality of video volumes of an environment from a plurality of cameras, wherein at least two individual video volumes of the plurality of video volumes depict the environment from different viewpoints, generating a panoptic video feed of the environment from the plurality of video volumes, detecting an event of interest occurring in the panoptic video feed, and isolating a video volume of the event of interest to produce a video excerpt.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a device, computer-readable medium, and method for detecting and sharing events of interest using panoptic computer vision systems. As discussed above, modern computer vision systems may be deployed in a "panoptic" configuration, for instance including overlapping 360 degree or spherical viewpoints, to present a panoramic view of a scene. A panoptic configuration may therefore allow viewers to experience the scene in a more immersive way, by enabling the viewers to view the scene in any direction from a central viewpoint (e.g., including behind the viewers and to the sides of the viewers). Thus, a panoptic display may be useful in recreational environments in which a tour guide or leader is helping a group of participants explore an environment, such as on a safari or a whale watching cruise. In such scenarios, the participants may be watching for specific events which may be fleeting in nature (e.g., the appearance of a lion, a whale, or the like). Due to the fleeting nature of the events as well as the uncertainty as to whether and where the events will occur, it is possible that some participants could miss an event entirely simply due to looking in the wrong direction at the wrong time.

Although a conventional panoptic display may allow a viewer to view an event occurring in a direction other than directly in front of the viewer, expert operation and post-hoc review are typically needed to review an event of interest. That is, any footage of an event of interest is first downloaded to a user endpoint device, reviewed, and then optionally shared with other users.

Examples of the present disclosure provide a computer vision system that constructs a 360 degree view of an environment in real time (i.e., as the environment is being filmed, subject to any network latency). In some examples, video volumes of an environment are captured from multiple different viewpoints (e.g., using cameras that are mounted in different locations around a vehicle), stitched together to create a 360 degree view of the environment, and analyzed for events of interest with low latency. Distribution of computing and buffering tasks allows for real time or near-real time review, replay, and/or sharing of events of interest. In further examples, sensors or other mechanisms may be used to track the same subject through multiple 360 views that are captured at different times, thereby allowing for content-based navigation (e.g., a whale watching tour guide may be able to show video volumes of a location where a known whale has been spotted before).

Examples of the present disclosure use buffering and event detection techniques to facilitate quick review of the video footage of an event of interest, which can then be stored for later re-watch, for sharing, for asking questions, and the like with relatively low latency. Moreover, stitching and review of video volumes can be performed in real time using system on chip capabilities, rather than being performed offline (as is typically done in conventional systems).

Within the context of the present disclosure, a "video volume" is understood to refer to a video image that includes a dimension of depth, such as three-dimensional or volumetric video. Thus, a video volume may be used to present a more immersive environment than might be possible to present using traditional two dimensional video. These and other aspects of the present disclosure are described in greater detail below in connection with the examples of FIGS. 1-3.

Figure 1:
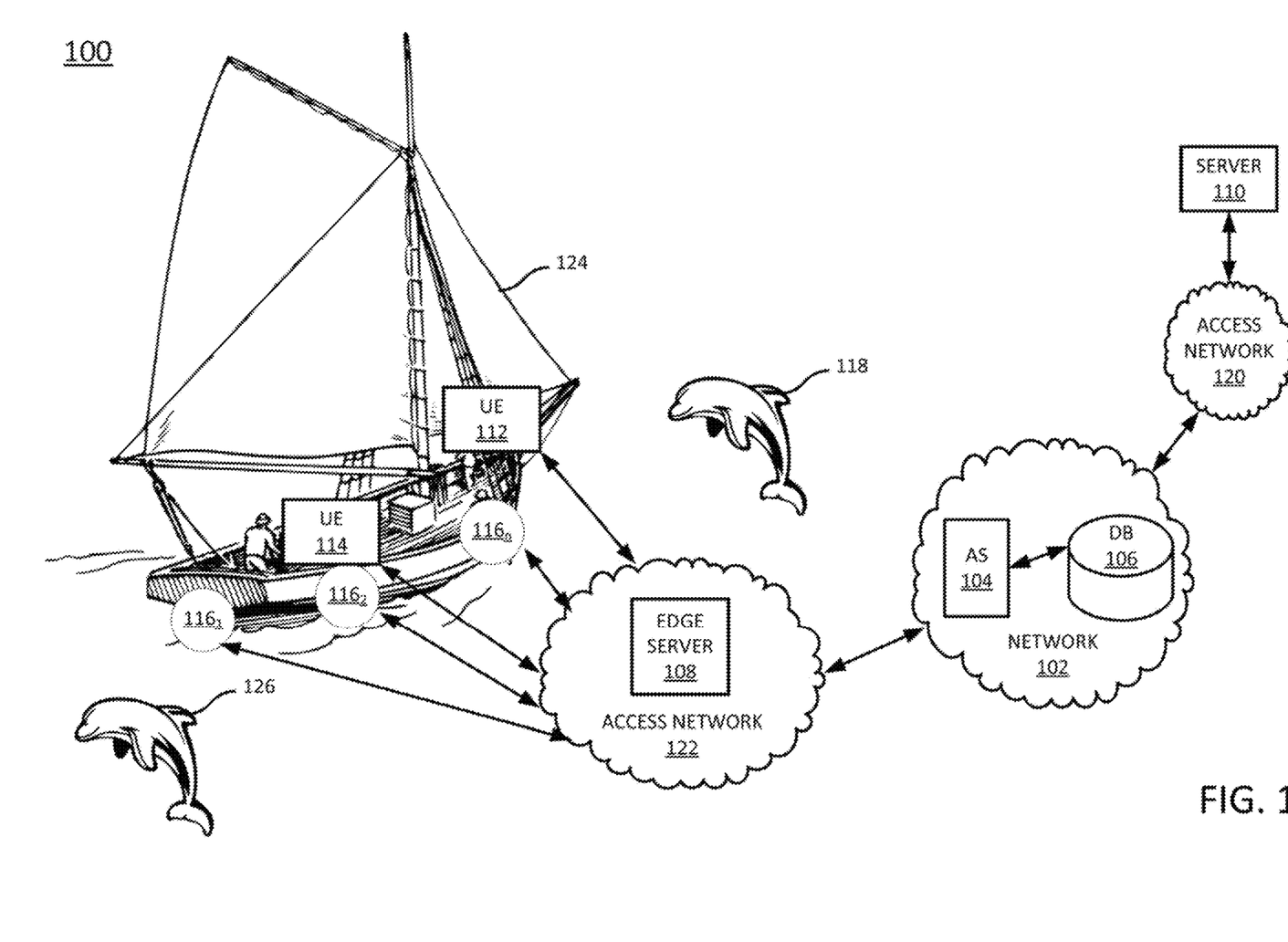
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
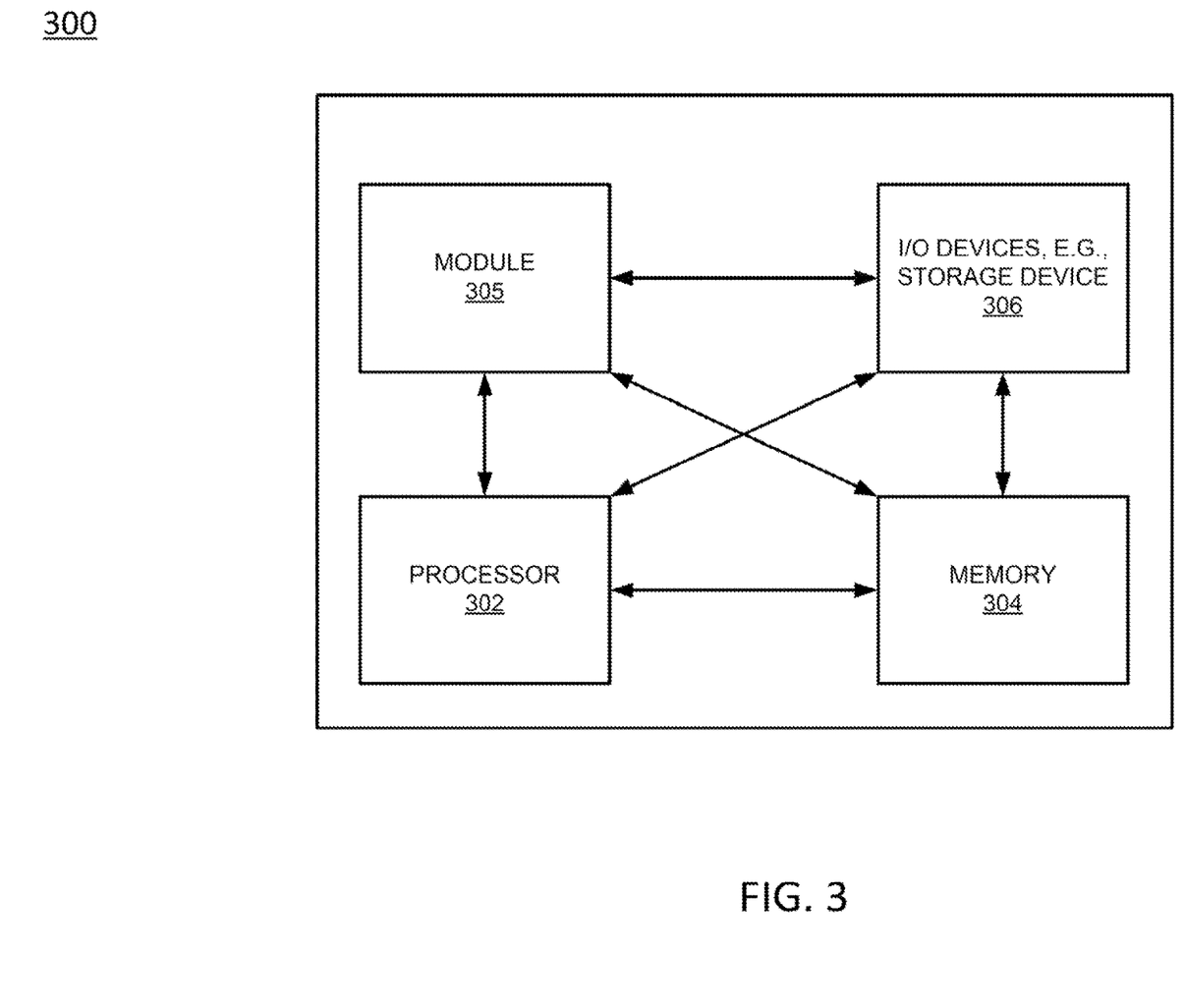
FIG. 3 illustrates a high level block diagram of a computing device specifically programmed to perform the steps, functions, blocks and/or operations described herein.

In accordance with the present disclosure, network 102 may include an application server (AS) 104, which may comprise a computing system or server, such as computing system 300 depicted in FIG. 3, and may be configured to provide one or more operations or functions in connection with examples of the present disclosure for detecting and sharing events of interest using panoptic computer vision systems. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for detecting and sharing events of interest using panoptic computer vision systems. For instance, the AS 104 may host an application that constructs a panoptic video feed by stitching together a plurality of video feeds from a plurality of cameras capturing different fields of view of the same environment, detects an event of interest in the panoptic video feed, isolates a video excerpt of the event of interest from the panoptic video feed, and shares the video excerpt with one or more display devices, in accordance with the present disclosure. In one example, AS 104 may comprise a physical storage device (e.g., a database server), to store video excerpts that are extracted from panoptic video feeds, as discussed in greater detail below.

In a further example, the AS 104 may also store user profiles which may specify user preferences that can be used to facilitate sharing of video excerpts of events of interest. For instance, in one example, participants in an experience that utilizes examples of the present disclosure may register with a service to receive video footage of events of interest on their personal user endpoint devices (e.g., mobile phones, tablet computers, head mounted displays, or the like) or to their personal contact information (e.g., mobile phone number, email address, social media handles, or the like). The profile for a participant may specify for which types of events of interest the participant wishes to receive (or not receive) video excerpts. The profile may also specify to which devices and/or personal contact information the participant prefers the video excerpts to be sent.

In a further example, the AS 104 may also store lists of different events of interest for different types of experiences. For example, for a whale watching cruise, events of interest may include the appearance of whales, dolphins, or other marine animals, passing of any notable buildings, ships, or locations along a route of the whale watching cruise, or the like. For a safari, events of interest may include sightings of specific types of animals, e.g., lions, elephants, zebras, or the like. For a stargazing expedition, events of interest may include a meteor shower, the sighting of specific constellations or planets, or the like. Each list may be tailored to a specific location (e.g., city, nature preserve, harbor, etc.) as well as a specific type of experience. Prior to embarking on an experience, a human operator may select one of these lists to facilitate detection of events of interest (e.g., whale watching cruise on the Puget Sound). Alternatively, the human operator may indicate the type and/or location of the experience, and the AS 104 may identify a default list for the type and/or location of the experience.

In a further example, the lists of events of interest may be updated and/or annotated with additional information over time. For instance, if the same event of interest (or same subject of an event of interest) is detected during multiple experiences, information acquired by virtue of the multiple detection events (e.g., a name of a whale who is frequently spotted, a favorite location of the whale, etc.) may be used to update the list of events of interest for the experiences.

In one example, the DB 106 may store the video excerpts, the user profiles, and/or the lists of events of interest, and the AS 104 may retrieve the video excerpts, the user profiles, and/or the lists of events of interest from the DB 106 when needed. For ease of illustration, various additional elements of network 102 are omitted from FIG. 1.

Figure 2:
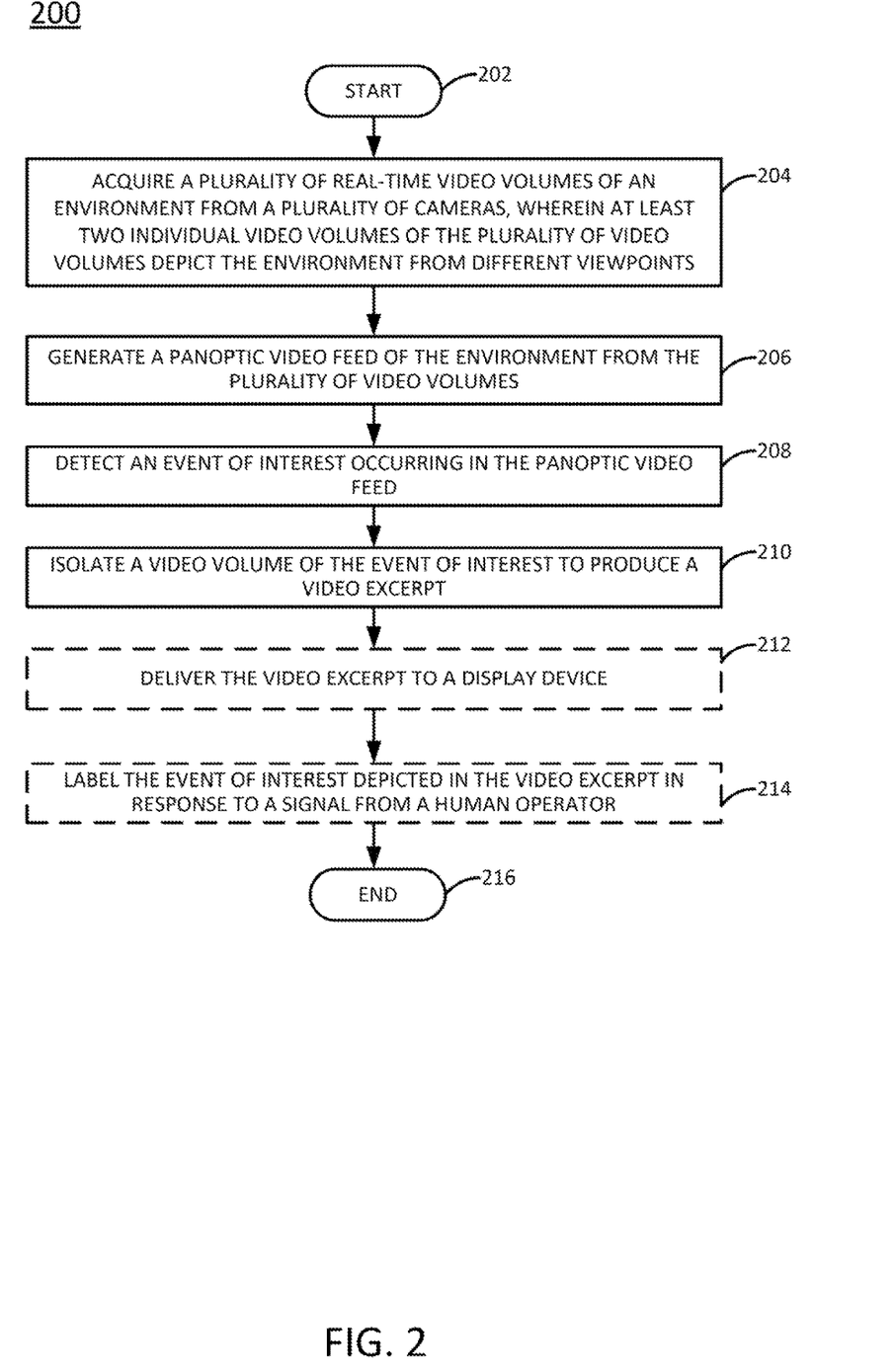
FIG. 2 illustrates a flowchart of an example method for detecting and sharing events of interest using panoptic computer vision systems, in accordance with the present disclosure.

In one example, access network 122 may include an edge server 108, which may comprise a computing system or server, such as computing system 300 depicted in FIG. 3, and may be configured to provide one or more operations or functions for detecting and sharing events of interest using panoptic computer vision systems, as described herein. For instance, an example method 200 for detecting and sharing events of interest using one or more panoptic computer vision systems is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., user endpoint (UE) devices 112 and 114 and one or more cameras $116_1$-$116_n$ (hereinafter collectively referred to as "cameras 116" or individually referred to as a "camera 116"). Access networks 120 and 122 may transmit and receive communications between server 110, UE devices 112 and 114, cameras 116, application server (AS) 104, other components of network 102, devices reachable via the Internet in general, and so forth. In one example, each of UE devices 112 and 114 may comprise a mobile device, a cellular smart phone, a wearable computing device (e.g., smart glasses, a virtual reality (VR) headset or other type of head mounted display, or the like), a laptop computer, a tablet computer, or the like. In one example, each of the UE devices 112 and 114 may comprise a computing system or device, such as computing system 300 depicted in FIG. 3, and may be configured to provide one or more operations or functions in connection with examples of the present disclosure for detecting and sharing events of interest using panoptic computer vision systems.

In one example, server 110 may comprise a network-based server for detecting and sharing events of interest using panoptic computer vision systems. In this regard, server 110 may comprise the same or similar components as those of AS 104 and may provide the same or similar functions. Thus, any examples described herein with respect to AS 104 may similarly apply to server 110, and vice versa. In particular, server 110 may be a component of a system operated by an entity that is not a telecommunications network operator. For instance, a provider of a system for detecting and sharing events of interest using panoptic computer vision systems may operate server 110 and may also operate edge sever 108 in accordance with an arrangement with a telecommunication service provider offering edge computing resources to third-parties. However, in another example, a telecommunication network service provider may operate network 102 and access network 122, and may also provide a system for detecting and sharing events of interest using panoptic computer vision systems via AS 104 and edge server 108.

In an illustrative example, a system for detecting and sharing events of interest using panoptic computer vision systems may be provided via AS 104 and edge server 108. In one example, a user (e.g., a human operator of an experience, such as a tour guide on a whale watching cruise or a safari) may engage an application on UE device 112 or 114 to establish one or more sessions with the system for detecting and sharing events of interest using panoptic computer vision systems, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between UE devices 112 and 114, cameras 116, and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, UE devices 112 and 114 and cameras 116 may communicate with access network 122, network 102, the Internet in general, etc., via a WLAN that interfaces with access network 122.

In the example of FIG. 1, a UE device 112 or 114 and cameras 116 may establish a session with edge server 108 for detecting and sharing events of interest using panoptic computer vision systems. For illustrative purposes, the edge server may detect events of interest that occur during an experience in an environment being explored by vehicle. In this regard, an example vehicle of a boat 124 (as might be used, for example, for a whale watching cruise) is illustrated in FIG. 1.

In one example, the plurality of cameras 116 may be mounted around the boat 124. Although three cameras are illustrated as being mounted to the visible side of the boat 124 in FIG. 1, it will be appreciated that any number of cameras 116 may be mounted to the boat 124, including on portions of the boat 124 which are not visible or are hidden in FIG. 1, such as the bow, undercarriage, and even the mast or sails of the boat. Additionally, supplemental cameras mounted to objects in the area to be explored (e.g., cameras on a buoy, a tent, a rock formation, an aerial or submersible drone, or other locations) may also be included as potential cameras 116. Each of the cameras 116 may be positioned and/or configured (e.g., angled, zoomed, or the like) to capture a different field of view of the environment surrounding the boat 124. These different fields of view may overlap. Each camera 116 may capture a respective video feed of the camera's field of view, and may transmit the video feed to the edge server 108, the AS 104, or to one of the UE devices 112 or 114 (which may be operated by a human operator of the boat 124 and/or by a participant or passenger of the boat 124). Moreover, although two UE devices 112 and 114 are illustrated as being present on the boat 124, any number of UE devices may be present. For instance, a tour guide may operate a first UE device, and one or more passengers on the boat 124 may operate their own UE devices. At least some of the cameras 116 may be capable of capturing three-dimensional and/or volumetric video.

According to examples of the present disclosure, the edge server 108, AS 104, or UE devices 112 and 114 may be configured to construct a panoptic video feed of the environment surrounding the boat 124, using the individual video feeds provided by the cameras 116. For instance, the edge server 108, AS 104, or UE devices 112 and 114 may "stitch" adjacent video feeds together to create a 360 or near-360 degree view of the environment surrounding the boat 124. The edge server 108, AS 104, or UE devices 112 and 114 may then monitor the panoptic video feed for the occurrence of events of interest. For instance, on a boat tour, an event of interest might include the sighting of a dolphin 118 or 126.

However, as discussed above, the sighting of a dolphin may be fleeting. Moreover, the passengers of the boat 124 may have no prior knowledge as to when or where a dolphin may be sighted. Thus, passengers who are looking to the front of the boat 124 may spot a dolphin 118 who is swimming ahead of the boat 124. However, while the passengers are looking to the front of the boat 124, the passengers may miss sighting a dolphin 126 who is swimming behind the boat 124.

The panoptic video feed constructed by the edge server 108, AS 104, or UE devices 112 and 114 may allow for the detection of the dolphin 126 even when no passengers can spot the dolphin 126. Thus, the passengers may be alerted (e.g., by a visible alert, an audio alert, a haptic alert, or simply a human operator providing notification) that another dolphin 126 is visible behind the boat 124. Moreover, the edge server 108, AS 104, or UE devices 112 and 114 may isolate and extract a video excerpt of the dolphin 126 (as well as a separate video excerpt of the dolphin 118) and may deliver the video excerpt to one or more display devices (including, optionally, one or more of the UE devices 112 and 114). Thus, passengers of the boat 124 may be alerted to events of interest that might otherwise be missed.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 2 illustrates a flowchart of an example method 200 for detecting and sharing events of interest using panoptic computer vision systems, in accordance with the present disclosure. In one example, the method 200 is performed by a component of the system 100 of FIG. 1, such as by the UE device 112 or 114, and/or any one or more components thereof (e.g., a processor, or processors, performing operations stored in and loaded from a memory), or by the UE device 112 or 114 in conjunction with one or more other devices, such AS 104, server 110, edge server 108, and so on. In one example, the steps, functions, or operations of method 200 may be performed by a computing device or system 300, and/or processor 302 as described in connection with FIG. 3 below. For instance, the computing device or system 300 may represent any one or more components of the system 100 of FIG. 1 that is/are configured to perform the steps, functions and/or operations of the method 200.

Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system.

The method 200 begins in step 202. In step 204, the processing system may acquire a plurality of video volumes of an environment from a plurality of cameras, wherein at least two individual video volumes of the plurality of video volumes depict the environment from different viewpoints. In one embodiment, the plurality of video volumes of the environment comprises a plurality of real-time video volumes of the environment, e.g., the plurality of real-time video volumes of the environment is captured by cameras on a vehicle as the vehicle traverses through the environment.

In one example, the plurality of cameras may include cameras that are mounted to a vehicle, such as a boat, a car, a truck, a bus, or the like. For instance, the vehicle may be a vehicle that is used to transport individuals who are taking a tour of the environment (e.g., a boat for a whale watching cruise, a truck for a safari, or the like). The cameras may be mounted at different locations around the vehicle in order to capture video volumes from different viewpoints surrounding the vehicle. In this case, the camera locations may be relatively fixed (e.g., some adjustment to the camera angles may be possible, but the cameras may be mounted in permanent or semi-permanent locations).

In one example, the plurality of cameras may be calibrated to facilitate generation of a panoptic video feed, as discussed in further detail below. For instance, each camera of the plurality of cameras may be positioned to capture a viewpoint having a known (i.e., known to the processing system) angle and direction relative to some reference point, e.g., the vehicle itself, such as facing the front of the vehicle, facing the back of the vehicle, facing a left side or right side of a vehicle, facing the top of the vehicle, facing the bottom of the vehicle, etc. In addition, other parameters of each camera (e.g., zoom) may be set to values that are known to the processing system.

In another example, the plurality of cameras may further include some cameras whose locations are not fixed. For instance, in one example, individual users (e.g., participants on a tour) may communicatively couple their endpoint devices (e.g., mobile phones, tablets, or the like which are equipped with cameras) to the processing system in order to provide additional video volumes. In this case, some of the cameras of the plurality of cameras may not necessarily be calibrated to facilitate generation of the panoptic video feed; however, the video feeds acquired from these cameras may augment the video feed by providing visual information in addition to what is acquired from the calibrated cameras.

In step 206, the processing system may generate a panoptic video feed of the environment from the plurality of video volumes. In one example, the processing system may store the plurality of video feeds in an engaged buffer and may "stitch" adjacent (potentially overlapping) video volumes using known techniques in order to create a 360 degree view of the environment.

In one example generating of the panoptic video feed may include removing an occlusion from a video feed of the plurality of video feeds. For instance, a video feed acquired from a camera that is mounted to the roof of a boat used for a whale watching cruise may capture images of several tour participants standing at the edge of the boat. The presence of these tour participants in the video feed may obstruct the view of a later viewer of the panoptic video feed. Thus, in one example, the processing system may utilize image analysis techniques (e.g., object recognition, facial recognition, text or symbol recognition, or the like) in order to detect specified objects in a video feed (e.g., people), and may digitally remove the specified objects from the video feed when utilizing the video feed to generate the panoptic video feed. For instance, techniques such as those described in U.S. Pat. No. 11,196,944 may be used to remove occlusions.

In another example, the processing system may also utilize data collected from one or more sensors on the vehicle to generate the panoptic video feed. For instance, motion data collected from one or more motion sensors or from one or more cameras of the plurality of cameras may be used to derive a static or still image from the plurality of video feeds. As an example, an object that is passing through the field of view of a first camera mounted to the front of the vehicle may remain static or still in the panoptic video feed until the object is no longer in the field of view of the last camera of the plurality of cameras.

In step 208, the processing system may detect an event of interest occurring in the panoptic video feed. In one example, the event of interest may be detected based on a signal from a human operator. The signal may comprise an electronic signal (e.g., the pushing of a button), a spoken signal (e.g., potentially including some trigger or key word), a gesture (e.g., pointing), or another type of signal. For instance, the leader of a whale watching tour may say, "Look to the right of the boat," which may indicate that some event of interest (e.g., the appearance of a whale) is occurring on the right side of the boat. The processing system may interpret the signal spatially, in order to determine where the event of interest is occurring and which cameras may have a view of the event of interest. For instance, if the human operator says that the event is happening to the right side of the boat, then the processing system may determine whether any of the cameras mounted on the right side of the boat have a view of an event of interest. If the human operator points, then the processing system may determine which cameras may have a view along a line of sight indicated by the direction in which the human operator is pointing.

In another example, the processing system may be provided with a list of predefined potential events of interest, such as specific subjects whose appearances have been designated (e.g., by a human operator) as events of interest. For example, the leader of a whale watching tour may indicate that the appearance of a whale is an event of interest, but that appearances of other animals (e.g., dolphins, seals, birds etc.) are also events of interest. Alternatively or in addition, a participant of the tour may indicate (e.g., through an application running on their mobile device) one or more specific subjects that they would like to see on the tour. Alternatively or in addition, a participant who is participating remotely (e.g., not physically present on the tour, but viewing the panoptic video feed from a remote location) may indicate (e.g., through an application running on their endpoint device) one or more specific subjects that they would like to see on the tour.

The processing system may then utilize image analysis techniques (e.g., object recognition, facial recognition, text or symbol recognition, etc.) to detect the presence of subjects whose appearances have been designated as events of interest. In one example, external data sources may be queried for additional data that may help to detect events of interest (e.g., specific subjects) in the panoptic video feed. For instance, if the list of potential events of interest includes the appearance of a bottlenose dolphin, but the processing system does not have sufficient information to identify a bottlenose dolphin in an image, the processing system may query an external database, a human operator, or the like for additional information (e.g., images, distinguishing features, known habitats, etc.) to assist in identifying bottlenose dolphins.

In another example, if no events of interest have been identified to the processing system, then the processing system may utilize a default list of events of interest. Different default lists of events of interest may be defined for different contexts and environments, and the processing system may select the appropriate default list based upon knowledge of the environment or context of the panoptic video feed, e.g., sudden appearance of an unseen object of a certain size, objects exceeding certain speed thresholds, etc. For instance, a default list of events of interest for a whale watching cruise may include the appearances of different marine animals; a default list of events of interest for a stargazing expedition may include meteor showers; a default list of events of interest for a bird watching tour may include the appearances of different birds and animals.

In yet another example, the processing system may identify an event of interest based on one or more events of interest detected in historical or previous executions of the method 200. For instance, on a previous whale watching cruise, a participant of the previous whale watching cruise may have identified a sighting of a dolphin as an event of interest; thus, during a current whale watching cruise, the processing system may identify a dolphin sighting as an event of interest.

In yet another example, the processing system may identify an event of interest based on sensor data received from one or more sensors, which may be mounted to the vehicle. For instance, sonar, audio, infrared, volumetric LIDAR, or other sensors may be capable of detecting the presence and/or approximate size and shape of an object within a defined proximity of the vehicle. Processing of the data received from the sensors may allow the processing system to identify the object, determine whether the presence of the object is an event of interest, and/or to track movement of the object to improve video capture of the object. For instance, if sonar data indicates that a whale is circling a boat used for a whale watching cruise, then the processing system may track the whale's movements to estimate the whale's trajectory and distance from the boat, and may control cameras positioned along the whale's trajectory to capture video of the whale. As an example, the processing system may adjust the zoom settings of the cameras positioned along the trajectory to capture close-up images of the whale. Information of the tracking system can also be provided to a navigation system of the vehicle to assist in moving or maintaining the vehicle in the direction of the event of interest.

In step 210, the processing system may isolate a video volume of the event of interest to produce a video excerpt. In one example, isolation of the video volume of the event of interest may comprise isolating video volumes of the event of interest in both space and time. For instance, portions of the panoptic video feed not depicting the event of interest may be cropped out or removed. Additionally, frames of the panoptic video feed occurring before and/or after the event of interest may be cropped out or removed. Thus, isolation of the video volume of the event of interest may involve creating a video excerpt of the panoptic video feed, where the video excerpt may comprise a time-based subset of the panoptic video feed (e.g., where the panoptic video feed lasts from time $t_1$ to time $t_x$, the processing system may isolate a portion of the panoptic video feed occurring between times $t_{1+y}$ to time $t_{x-z}$). In addition, the video excerpt may comprise a spatial subset of the panoptic video feed (e.g., where the panoptic video feed depicts a 360 degree scene, the processing system may isolate an n degree portion of the panoptic video feed occurring in a specific direction).

In addition, isolating the video volume of the event of interest may comprise performing one or more image processing techniques on the video excerpt in order to enhance the video excerpt. For instance, the processing system may process the video excerpt to remove audio or visual static, audio or visual noise, or shaking, to increase the image resolution, to remove obstructions, or the like.

In optional step 212, the processing system may deliver the video excerpt to a display device. The display device may be a device that may be used to review the video excerpt. For instance, where the panoptic video feed depicts a whale watching cruise, the boat may include a monitor on which the video excerpt can be played for participants to view, and the processing system may deliver the video excerpt to the monitor.

In another example, the processing system may deliver the video excerpt to the personal user endpoint devices (e.g., mobile phones, tablet computers, head mounted displays, or the like) of one of more participants and/or the human operator of the whale watching cruise. For instance, a participant may register their mobile phone number, email address, social media handle, or the like with the processing system, and may request that the processing system deliver any video excerpts of events of interest to the registered mobile phone number, email address, or social media handle. In a further example, a user profile associated with the mobile phone number, email address, or social media handle may identify specific types of events of interest for which video excerpts are to be delivered (e.g., deliver video excerpts of whales, but do not deliver video excerpts of other animals). Thus, participants may be able to personalize the types of video excerpts that the participants receive.

In one example, the video excerpt may be delivered by the processing system in the form of the original video feed (e.g., a video feed generated by a single camera) and/or in the form of a "stitched" video feed (e.g., a video feed generated by stitching the individual video feeds from multiple different cameras).

In one example, the processing system may deliver the video excerpt to the display device as part of a continuous stream of video data. For instance, as the processing system is generating the panoptic video feed, the processing system may extract portions of the panoptic video feed for inclusion in a continuous stream of video data. The continuous stream of video data may include one or more video excerpts depicting events of interest, as well as other video data depicting other subjects (e.g., scenery, points of interest, etc.).

In optional step 214, the processing system may label the event of interest depicted in the video excerpt in response to a signal from a human operator e.g., via a user endpoint device. In one example, the signal may comprise a spoken label, a text-based label, a gesture-based label (e.g., using American Sign Language or another gesture), or other types of label. For instance, an operator of a whale watching cruise may refer, verbally, to a whale depicted in the video excerpt by name. In response, the processing system may label the video excerpt (and, optionally, other video excerpts including stored or future video excerpts depicting the same whale) with the name spoken by the operator. This may allow the processing system to generate a compilation of video excerpts of the same subject or event of interest, or to augment future video excerpts depicting the same subject or event of interest with additional information.

The method 200 may end in step 216.

Thus, examples of the present disclosure leverage the use of panoptic computer visual system configurations in recreational settings in order to facilitate video capture of events of interest. Implementations of the present disclosure may be especially useful in use contexts in which events of interest may be fleeting in nature and/or difficult to predict (e.g., in terms of when and where the events of interest will occur. For instance, examples of the present disclosure may enhance the user experience in situations where many individuals are riding in a single vehicle to observe natural environments of phenomena (e.g., safaris, whale watching cruises, bird watching expeditions, stargazing, etc.). Examples of the present disclosure could also be used to facilitate scientific cataloging of events and wildlife (e.g., to determine actions of the wildlife in a specific location and/or to synchronize the actions to specific entities with fingerprinting, similar to visual tagging techniques). Moreover, while such contexts are described above as being led by a human operator (e.g., a tour guide), it will be appreciated that examples of the present disclosed may be implemented as an automated or "virtual" tour guide that, once initiated, is capable of conducting a tour with little or no human assistance.

Moreover, the creation and delivery of video excerpts of events of interest may allow users to share events of interest. For instance, a participant on a whale watching cruise may review a continuous video feed of the cruise on their mobile phone, and may notice an unusual bird depicted in a particular shot of the continuous video feed. The participant may utilize an application on his or her mobile phone to isolate video data depicting the bird, and may send the isolated video data to the human operator of the cruise and/or to other participants of the cruise in order to see if the bird can be identified. Similarly, a participant may send a portion of the continuous video feed (e.g., an isolated event of interest, or other video data) to a friend or family member who is not present, or may post the portion of the continuous video feed to their social media account (if permitted by the operator of the processing system).

In further examples, examples of the present disclosure could be used to enhance autonomous or semi-autonomous navigation systems for vehicles. For instance, when detecting events of interest in the environment surround a vehicle, examples of the present disclosure may be able to track those events of interest as discussed above. In some examples, tracking and estimating the trajectory of an event of interest may include sending instructions to a navigation system of the vehicle so that the vehicle may follow the event of interest (e.g., a boat may follow a pod of whales that has been detected). Similar techniques may also be used to allow the vehicle to avoid obstructions or possible hazards (e.g., prevent a boat from coming too close to a whale, navigating around other watercraft, etc.).

In a further example, communications between the panoptic computer vision system and the vehicle navigation system could enable further enhancements to on-board notification when events of interest are detected. For instance, lights along one side of the vehicle may be lit when an event of interest is detected on that side of the vehicle.

In further examples, examples of the present disclosure may be connected to other automated systems that are capable of identifying objects, such as virtual assistants, bots, search systems, and the like. These other automated systems may be asserted against an online data resource (e.g., the Internet) to perform matching and/or retrieve information about identified subjects. For instance, events of interest can be annotated with additional information before sharing (e.g., video footage of a whale sighting can be annotated with the estimated size and/or age of the whale, general information about the species of whale, or the like). In another example, the additional information can be delivered to a display that is embedded in a window of the vehicle. For instance, windows of the vehicle may be equipped with display elements to provide an augmented reality-type display that superimposes digital information over the view of the environment that is visible through the window. Windows of this type can also be used to present tracking information for events of interest (e.g., "whale approaching from this side").

In further examples still, examples of the present disclosure may be linked to hunting and/or tracking systems to overcome difficulties with technology assistance (such as global positioning systems) in these systems.

In further examples, the individual video feeds from the plurality of cameras could be used to generate a volumetric video presentation of the environment. In the volumetric video presentation, alerts may be included to indicate events of interest and the locations and times at which the events of interest occur.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1, or described in connection with the method 200 of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for detecting and sharing events of interest using panoptic computer vision systems, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for detecting and sharing events of interest using panoptic computer vision systems (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for detecting and sharing events of interest using panoptic computer vision systems (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
acquiring, by a processing system including at least one processor, a plurality of video volumes of an environment from a plurality of cameras, wherein at least two individual video volumes of the plurality of video volumes depict the environment from different viewpoints, and wherein the plurality of cameras includes at least one camera mounted to a vehicle and a camera of a user endpoint device of a passenger of the vehicle;
generating, by the processing system in real time as the plurality of video volumes is acquired, a panoptic video feed of the environment from the plurality of video volumes;
detecting, by the processing system, an event of interest occurring in the panoptic video feed, wherein the detecting comprises using a computerized image analysis technique to automatically identify a presence of a subject whose appearance is included in a list of one or more predefined events of interest in real time while the subject is present in the environment; and
isolating, by the processing system, a video volume of the event of interest to produce a video excerpt,
wherein the processing system is operated by an operator of a tour in the environment, wherein the at least one camera mounted to the vehicle is controlled by the operator of the tour and is calibrated to facilitate the generating of the panoptic video feed, and wherein the user endpoint device is controlled by the passenger who is independent of the operator of the tour and the camera of the user endpoint device is not calibrated to facilitate the generating of the panoptic video feed.

2. The method of claim 1, wherein data from a sensor is used to track a trajectory of the event of interest.

3. The method of claim 1, wherein the isolating isolates one or more video volumes of the event of interest in both space and time.

4. The method of claim 1, wherein the isolating utilizes an image processing technique to enhance the video excerpt.

5. The method of claim 1, further comprising:
delivering, by the processing system, the video excerpt to a display device.

6. The method of claim 5, wherein the display device comprises a personal user endpoint device of a person who is present in the environment.

7. The method of claim 5, wherein the display device comprises a personal user endpoint device of a person who is viewing the environment remotely.

8. The method of claim 5, wherein the display device is embedded in a window of the vehicle to which at least one camera of the plurality of cameras is mounted.

9. The method of claim 5, wherein the video excerpt is delivered as part of a continuous stream of video data.

10. The method of claim 1, further comprising:
labeling the event of interest depicted in the video excerpt in response to a signal from a human operator.

11. The method of claim 10, wherein the signal comprises at least one of: a spoken signal, a text-based signal, or a gesture.

12. The method of claim 1, wherein the video volume of the event of interest is annotated with data from a data source.

13. A non-transitory computer-readable medium storing instructions which, when executed by a processing system including at least one processor, cause the processing system to perform operations, the operations comprising:

acquiring a plurality of video volumes of an environment from a plurality of cameras, wherein at least two individual video volumes of the plurality of video volumes depict the environment from different viewpoints, and wherein the plurality of cameras includes at least one camera mounted to a vehicle and a camera of a user endpoint device of a passenger of the vehicle;

generating in real time, as the plurality of video volumes is acquired, a panoptic video feed of the environment from the plurality of video volumes;

detecting an event of interest occurring in the panoptic video feed, wherein the detecting comprises using a computerized image analysis technique to automatically identify a presence of a subject whose appearance is included in a list of one or more predefined events of interest in real time while the subject is present in the environment; and isolating a video volume of the event of interest to produce a video excerpt, wherein the processing system is operated by an operator of a tour in the environment, wherein the at least one camera mounted to the vehicle is controlled by the operator of the tour and is calibrated to facilitate the generating of the panoptic video feed, and wherein the user endpoint device is controlled by the passenger who is independent of the operator of the tour and the camera of the user endpoint device is not calibrated to facilitate the generating of the panoptic video feed.

14. A system comprising:

a processing system including at least one processor; and, a non-transitory computer-readable medium storing instructions which, when executed by the processing system, cause the processing system to perform operations, the operations comprising:

acquiring a plurality of video volumes of an environment from a plurality of cameras, wherein at least two individual video volumes of the plurality of video volumes depict the environment from different viewpoints, and wherein the plurality of cameras includes at least one camera mounted to a vehicle and a camera of a user endpoint device of a passenger of the vehicle;

generating in real time, as the plurality of video volumes is acquired, a panoptic video feed of the environment from the plurality of video volumes;

detecting an event of interest occurring in the panoptic video feed, wherein the detecting comprises using a computerized image analysis technique to automatically identify a presence of a subject whose appearance is included in a list of one or more predefined events of interest in real time while the subject is present in the environment; and isolating a video volume of the event of interest to produce a video excerpt, wherein the processing system is operated by an operator of a tour in the environment, wherein the at least one camera mounted to the vehicle is controlled by the operator of the tour and is calibrated to facilitate the generating of the panoptic video feed, and wherein the user endpoint device is controlled by the passenger who is independent of the operator of the tour and the camera of the user endpoint device is not calibrated to facilitate the generating of the panoptic video feed.

15. The method of claim 1, wherein the panoptic video feed presents a 360 degree view of the environment.

16. The method of claim 1, wherein the vehicle comprises a vehicle that is at least one of: autonomous or semi-autonomous.

17. The method of claim 16, wherein the processing system sends instructions to a navigation system of the vehicle in response to the detecting to cause the vehicle to follow the event of interest.

18. The non-transitory computer-readable medium of claim 13, wherein the vehicle comprises a vehicle that is at least one of: autonomous or semi-autonomous.

19. The non-transitory computer-readable medium of claim 18, wherein the processing system sends instructions to a navigation system of the vehicle in response to the detecting to cause the vehicle to follow the event of interest.

20. The system of claim 14, wherein the vehicle comprises a vehicle that is at least one of: autonomous or semi-autonomous.

* * * * *